United States Patent

[11] 3,595,559

| [72] | Inventor | John Francis Gettinger<br>1500 N.W. 1st Ave., Fort Lauderdale, Fla. 33311 |
|---|---|---|
| [21] | Appl. No. | 837,380 |
| [22] | Filed | June 30, 1969 |
| [45] | Patented | July 27, 1971 |

[54] ADJUSTABLE HOLDING DEVICE
7 Claims, 5 Drawing Figs.

[52] U.S. Cl. .................................................. 269/77, 269/131
[51] Int. Cl. ..................................................... B23g 1/12
[50] Field of Search .......................................... 269/74–80, 130, 131, 132

[56] References Cited
UNITED STATES PATENTS

| 1,336,912 | 4/1920 | Manley | 269/74 X |
| 1,697,117 | 1/1929 | Hilstad et al. | 269/75 X |
| 2,488,296 | 11/1949 | Kraus | 269/75 X |
| 2,829,781 | 4/1958 | Nomsen | 269/131 X |

FOREIGN PATENTS

| 554,356 | 6/1943 | Great Britain | 269/130 |

Primary Examiner—William S. Lawson
Attorney—Settle & Oltman

ABSTRACT: An adjustable holding device for holding automobile bumpers while work is being performed on them. The device includes a support base having a vertical component, and a rotatable cylinder horizontally mounted on the vertical component. At least two engaging elements for engagement with the edges of a bumper are mounted in parallel on the rotatable cylinder. Also included is a holding mechanism mounted on the engaging elements which is used for holding a bumper in position when it is engaged with the engaging elements, and a brake mechanism for holding the rotatable cylinder in a fixed position.

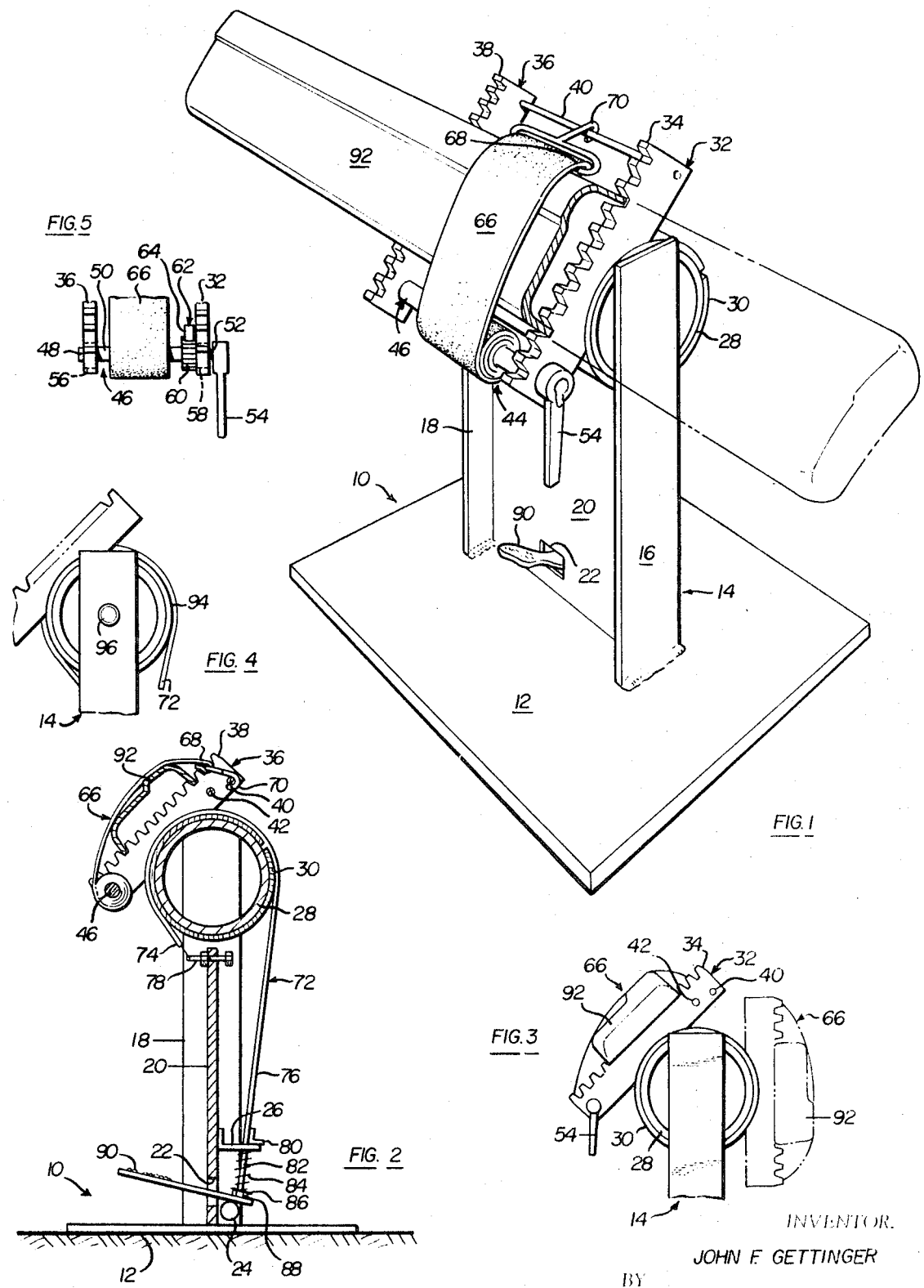

ADJUSTABLE HOLDING DEVICE

BACKGROUND OF THE INVENTION

1. Field of the Invention

This invention relates to an adjustable holding device for automobile bumpers and the like. Automobile bumpers are rather expensive items to replace when damaged. If at all possible, damaged bumpers are repaired rather than replaced. Damaged automobile bumpers are also salvaged from wrecked automobiles for repair and resale in the replacement market.

2. The Prior Art

When an automobile bumper is repaired it is conventionally put into a vise to hold it steady while dents are pounded out or it is ground or welded.

It is often necessary to reposition the bumper in the vise to achieve the best working angle. This requires that the bumper be put in and out of the vise several times during the course of the repair. This is time consuming and uneconomical. In addition it puts a physical strain on the repairman. Moreover, it is not always possible to position the bumper in the vise in the precise desired angle.

It is an object of this invention to provide a device for holding automobile bumpers or similar pieces in which the work position of the bumper can be adjusted without removing the bumper from the apparatus.

It is a further object of this invention to provide a device for holding automobile bumpers or similar pieces in which the work position of the bumper can be adjusted through an angle of almost 360°, and the position holding and release means is foot operated, leaving the hands free for other uses.

Other objects of this invention will appear in the following description and appended claims, reference being had to the accompanying drawings forming a part of this specification wherein like reference characters designate corresponding parts in the several views.

IN THE DRAWINGS

FIG. 1 is a perspective view of the device of the invention;

FIG. 2 is a cross-sectional view of the device of the invention;

FIG. 3 is a side elevational view of the upper part of the device of the invention;

FIG. 4 is a side elevational view of the upper part of an alternate embodiment of the device of the invention; and FIG. 5 is a top view of the rotary shaft and ratchet mechanism of the device of the invention.

PREFERRED EMBODIMENT OF THE INVENTION

The adjustable holding device 10 of this invention comprises a rectangular base 12 upon which is welded a vertically positioned I-beam consisting of two parallel rails 16 and 18 connected by a web 20 which extends approximately two-thirds of the way up from the base 12 between the rails 16 and 18. The web 20 has a slot 22 in it at the bottom thereof. A bar 24 is horizontally positioned across the slot 22 and fastened to the web 20 on each side of the slot 22. A retaining plate 26 having an orifice (not shown) in it is horizontally mounted between the rails 16 and 18 near the lower end of the I-beam 14 and projects slightly outward therefrom.

A cylindrical hub 28 is horizontally mounted in the top part of the I-beam 14, between the rails 16 and 18.

A rotatable split or continuous cylinder 30 is concentrically positioned around the hub 28, a split cylinder being shown.

A rectangular holding plate 32 having a notched upper surface 34 is welded to one edge of the cylinder 30 and another rectangular holding plate 36 having a notched upper surface 38 is welded to the opposite edge of the cylinder, in parallel relation to the holding plate 32.

Two catch bars 40 and 42 are mounted between the holding plates 32 and 36 at one of the ends of the plates. A rotary shaft and ratchet mechanism 44 is mounted between the opposite ends of the plates.

The rotary shaft and ratchet mechanism comprises a rotatable shaft 46 having a first end section 48, an enlarged diameter section 50, and a second end section 52 adapted to receive a socket wrench 54. The shaft is supported at the first end section 48 by a bushing 56 contained in the end of the holding plate 36 and is supported at the second end section 52 by a bushing 58 contained in the end of the holding plate 32. The second end section 52 of the shaft 46 extends beyond the bushing. A ratchet wheel 60 is permanently mounted on the shaft 46, adjacent the enlarged diameter section 50 on the side supported by the bushing 58.

A pawl 62 having a handle 64 attached thereto is pivotally mounted on the inside of the holding plate 32 and is engageable with the ratchet wheel 60. The handle 64 enables the pawl 62 to be engaged or disengaged with the ratchet wheel 60 as desired.

A belt 66 having a free end 68 with a catch 70 attached to it is fastened to and rolled around the enlarged diameter section 50 of the shaft 46.

A flexible metal brake band 72 having a fixed end 74 and a free end 76 is lapped over the split cylinder 30. The fixed end 74 is fastened to the web 20 of the I-beam 14 on the side opposite from the retaining plate 26 with an adjustable bolt 78. An outwardly extending stop 80 is fixed to the free end 76.

A bolt 82 is attached to the top of the free end 76 of the band 72 and extends through the orifice in the retaining plate 26. A spring 84 is positioned around that portion of the bolt 82 extending below the plate 26 and is biased against the underside of the plate 26 and against a washer 86 around the end of the bolt 82 which is held in place by a nut 88.

A foot pedal 90 using the rod 24 as a fulcrum, extends through the slot 22 in the web 20. One end of the foot pedal 90 is positioned underneath the bolt 82 and is in contact therewith; the other end is free. The foot pedal may be extended as by means of bars (not shown) so that it can be depressed from either side of the device.

In at rest position, the expansion action of the spring 84 draws the band 72 tightly around the split cylinder 30 maintaining the cylinder 30 in the position it then occupies.

When the free end of the foot pedal 90 is depressed, the spring 82 is compressed, relieving tension on the band 72. The cylinder 30 is then free to be moved to another position.

To operate the apparatus of the invention, a desired position for the cylinder 30 is selected. The foot pedal 90 is then actuated, releasing the tension on the band 72, and the cylinder 30 is positioned in the preselected position. Then the foot pedal 90 is released, allowing the spring 82 to expand, placing the band 72 under tension and locking the cylinder 30 into place.

Then a bumper 92 is placed on top of the notched plates 32 and 36 with at least one edge of the bumper digging into the notches on the top surfaces 34 and 38 of the plates. The belt 66 is then drawn over the bumper 92 and the catch 70 is hooked onto one of the bars 40 or 42. The belt 66 is then tightened by rotating the shaft 46 with a wrench. The belt 66 is maintained in the tightened position with the ratchet wheel 60 and pawl 62 interacting. The tight belt 66 holds the bumper 92 firmly on the notched plates 32 and 36.

In an alternative embodiment (as shown in FIG. 4) the cylinder 30 is omitted and a cylindrical drum 94 is rotatably mounted on a shaft 96 mounted between the rails 16 and 18 of the I-beam 14. The band 72 is then lapped over the rotatable drum 94. In all other respects the apparatus is the same.

The adjustable device 10 of this invention enables a bumper 92 to be mounted on it and rotated through a number of different working angles without the position of the bumper 92 on the device 10 having to be adjusted. The cylinder 30 is capable of being rotated through almost 360°, the limitation on the degree of rotation being that the bumper 92 catches on one of the sides of the I-beam 14 as the cylinder 30 is rotated. Nevertheless, the number of working angles which can be achieved is practically without limit. The cylinder 30 may be continuous or split, and may even be omitted if desired.

The foot-operated brake mechanism is time and energy saving, and frees both hands for other uses. The brake mechanism holds the cylinder in any desired position.

I claim:

1. An adjustable device for holding a workpiece while work is being performed on it comprising a support means having a vertical component, axle means for supporting a cylinder horizontally on said vertical component, a rotatable cylinder mounted horizontally on said axle means, at least two parallel elements having means for engagement with the edges of a bumper mounted on said rotatable cylinder, means for holding said bumper in position on said elements, means peripherally engaging said rotatable cylinder for holding said rotatable cylinder in a fixed position and means for releasing said cylinder from a fixed position.

2. The device of claim 1 wherein said means for engagement with the edges of said bumper are notches in the upper surface of said elements.

3. The device of claim 1 wherein said means for holding said bumper in position when it is engaged with said engaging means is a belt having one end fixed to a rotatable support mounted at one of the ends of said parallel elements and the other end engageable with a support mounted between the opposite ends of said parallel elements, whereby when said bumper is engaged with said engagement means, said belt is lapped over said bumper and engaged with said support at the opposite ends of said parallel elements, and said rotatable support is rotated to tighten said belt against said bumper.

4. The device of claim 1 wherein said means for holding said rotatable cylinder in a fixed position is a flexible brake band lapping said cylinder having one end attached to one side of said vertical component and the other end spring biased against a retaining means on the opposite side of said vertical component, whereby said brake band is drawn tightly around an arc portion said cylinder holding it in a fixed position.

5. An adjustable device for holding an automobile bumper and the like while work is being performed on it comprising a base, an I-beam vertically mounted on said base, said I-beam comprising two parallel rails joined by a web which extends between said rails and which has an opening near said base; an outwardly extending retaining plate having an orifice therein horizontally mounted between said rails; a bar horizontally mounted between said rails and extending across a portion of said opening in said web; a cylindrical hub horizontally mounted on said I-beam between said rails above said web; a rotatable cylinder concentrically mounted around said hub; at least two holding plates having notched upper surfaces mounted in parallel on said rotatable cylinder, said holding plates having a catch bar mounted therebetween at one of their ends, and a shaft having a ratchet wheel attached thereto mounted at the other of their ends, one end of said shaft being adapted to receive a means for rotating said shaft; a pawl mounted on one of said plates engageable with said ratchet wheel; a belt having one end fixed to said rotary shaft and the other end engageable with said catch bar; a flexible brake band lapping the top portion of said cylinder, one end of said band being fastened to one side of said I-beam and the other end having a bolt attached thereto which extends downwardly through said orifice in said outwardly extending retaining plate horizontally mounted on said I-beam, and which is spring biased against the underneath side of said plate; and a foot pedal having a first and second end extending through said opening in said web of said I-beam fulcrumed on said bar across said opening, said first end of said pedal being located under said bolt, whereby a downward force on said second end of said pedal compresses said spring thus relieving the tension on the brake band and allowing the cylinder to be rotated to a new position.

6. An adjustable device for holding a workpiece while work is being performed on it, comprising:
   a. support means having a vertical component,
   b. axle means for supporting a cylinder horizontally on said vertical component,
   c. a rotatable cylinder mounted horizontally on said axle means,
   d. means mounted on said cylinder for retaining a workpiece,
   e. braking means for holding said cylinder in a fixed position comprising a flexible element lapping around an arc of said cylinder having one end fixed and the other end spring biased against a retaining means, whereby said flexible element is drawn tightly around an arc portion of said cylinder holding it in a fixed position, and,
   f. means for releasing the braking action of said flexible element.

7. The adjustable device as claimed in claim 6 in which said releasing means comprises a foot pedal.